(12) United States Patent
Lin

(10) Patent No.: US 7,173,376 B1
(45) Date of Patent: Feb. 6, 2007

(54) MULTI-FUNCTIONAL HIGH INTENSITY DISCHARGE AUTOMOBILE HEADLAMP

(75) Inventor: Jack Lin, Taichung Hsien (TW)

(73) Assignee: Poweramper Electronic Industry Corp., Taichung Hsien (TW)

( * ) Notice: Subject to any disclaimer, the term of this patent is extended or adjusted under 35 U.S.C. 154(b) by 0 days.

(21) Appl. No.: 11/195,556

(22) Filed: Aug. 3, 2005

(51) Int. Cl.
*B60Q 1/02* (2006.01)

(52) U.S. Cl. .................................... 315/82; 315/308

(58) Field of Classification Search .................. None
See application file for complete search history.

(56) References Cited

U.S. PATENT DOCUMENTS

| | | | |
|---|---|---|---|
| 4,686,423 A * | 8/1987 | Eydt | 315/82 |
| 5,463,287 A * | 10/1995 | Kurihara et al. | 315/307 |
| 6,049,171 A * | 4/2000 | Stam et al. | 315/82 |
| 6,791,273 B2 * | 9/2004 | Ito et al. | 315/82 |
| 2003/0030380 A1 * | 2/2003 | Oda | 315/77 |

\* cited by examiner

*Primary Examiner*—Thuy V. Tran
*Assistant Examiner*—Dieu Hien Duong

(57) ABSTRACT

A multi-functional high intensity discharge automobile headlamp features a circuit board installed within a system control box. The circuit board comprise a circuit for automatic detection and protection so that the voltages of the near lights and far lights can be determined and correctly switched, a circuit for DC/DC conversion connected to a far/near light switch and a DC/AC voltage regulator so that the voltages necessary for the near or far lights can be supplied, a circuit for voltage regulation and high-voltage starting so that the high-voltage power can be suitably controlled, a circuit for near light high-voltage control, a circuit for far light high-voltage control and a DC/AC voltage regulator for providing a low-frequency, square-wave, AC signal for voltage regulation.

4 Claims, 6 Drawing Sheets

MULTI-FUNCTIONAL HIGH INTENSITY DISCHARGE AUTOMOBILE HEADLAMP

FIELD OF THE INVENTION

The present invention relates to high intensity discharge headlamp (HID head lamps), more particularly to a multi-functional high intensity discharge automobile headlamp for providing the functions of correct conversion between a voltage for near lights, a voltage for far lights and a common voltage for the near and far lights.

BACKGROUND OF THE INVENTION

There are two ways to control automobile headlamps of the prior art: one is for halogen headlamps and the other is for high intensity gas discharge headlamps. The halogen headlamps directly use the voltage transmitted from the power supply of an automobile to control the illumination of the halogen lamps. Further, two lateral sides of a car are each installed with a motor for moving a corresponding halogen lamp, whereby the halogen lamp can be either a far light or a near light. Due to a lack of a voltage regulator, the voltage applied to the halogen lamps is unstable, directly influencing the lifespan of the lamps and probably causing illumination instability. The high intensity gas discharge headlamps are argon-filled light bulbs respectively installed on the two lateral sides of an automobile, each powered by the power supply of an automobile through a voltage regulator. The regulator also determines whether to cut down the voltage. Since that the power supply of an automobile supplies the voltage needed for the far lights and the near lights and that the voltage is stabilized by a voltage regulator within a control box, the supplied voltage can be maintained at a constant level and its noises can be limited, whereby, as the light is switched between near lights and far lights, the illumination quality of the multi-functional high intensity discharge automobile headlamp of the prior art will be better. However, since the argon-filled light bulbs are powered by the power supply of an automobile, the low voltage has an unstable value in voltage, leading to a problem of floating voltage (6V or 8V) and therefore intensity instability of the near lights powered by the low voltage. The problem will shorten the life of the bulbs.

SUMMARY OF THE INVENTION

The primary objective of the present invention is to provide a multi-functional high intensity discharge automobile headlamp using the circuit for automatic detection and protection in a control box detects and assures the output voltage from the power supply of an automobile between a low value, a high value and a common value, assisting the headlamp to acquire a stable voltage.

The secondary objective of the present invention is to provide a multi-functional high intensity discharge automobile headlamp wherein there are a circuit for DC/DC conversion and a Hi/Low switch in the control box. The Hi/Low switch reads the voltage value from the circuit for DC/DC conversion and utilizes the circuit for automatic detection and protection to activate the function of the switching. The output voltage value is sent to the circuit for near light high-voltage control and the circuit for far light high-voltage control to supply the desired voltages.

It is a further advantage that the multi-functional high intensity discharge automobile headlamp has a circuit for voltage regulation and high-voltage starting (installed within a control box) for supplying the high-voltage electric power. The circuit for voltage regulation and high-voltage starting further restricts the operational power within a selective value, whereby the lamps can operate under a stable condition and prevent glittering of the lamps.

To achieve the above objectives, the multi-functional high intensity discharge automobile headlamp comprises only a gas discharge headlamp, a system control box and power cords, which allows a car maintenance person to install it within a car of arbitrary brands. It is not necessary to worry about the glittering phenomenon due to incompatibility. Therefore, the multi-functional high intensity discharge automobile headlamp can be used in cars of different specifications.

The various objects and advantages of the present invention will be more readily understood from the following detailed description when read in conjunction with the appended drawings.

DETAILED DESCRIPTION OF THE PREFERRED EMBODIMENTS

Figure 1:
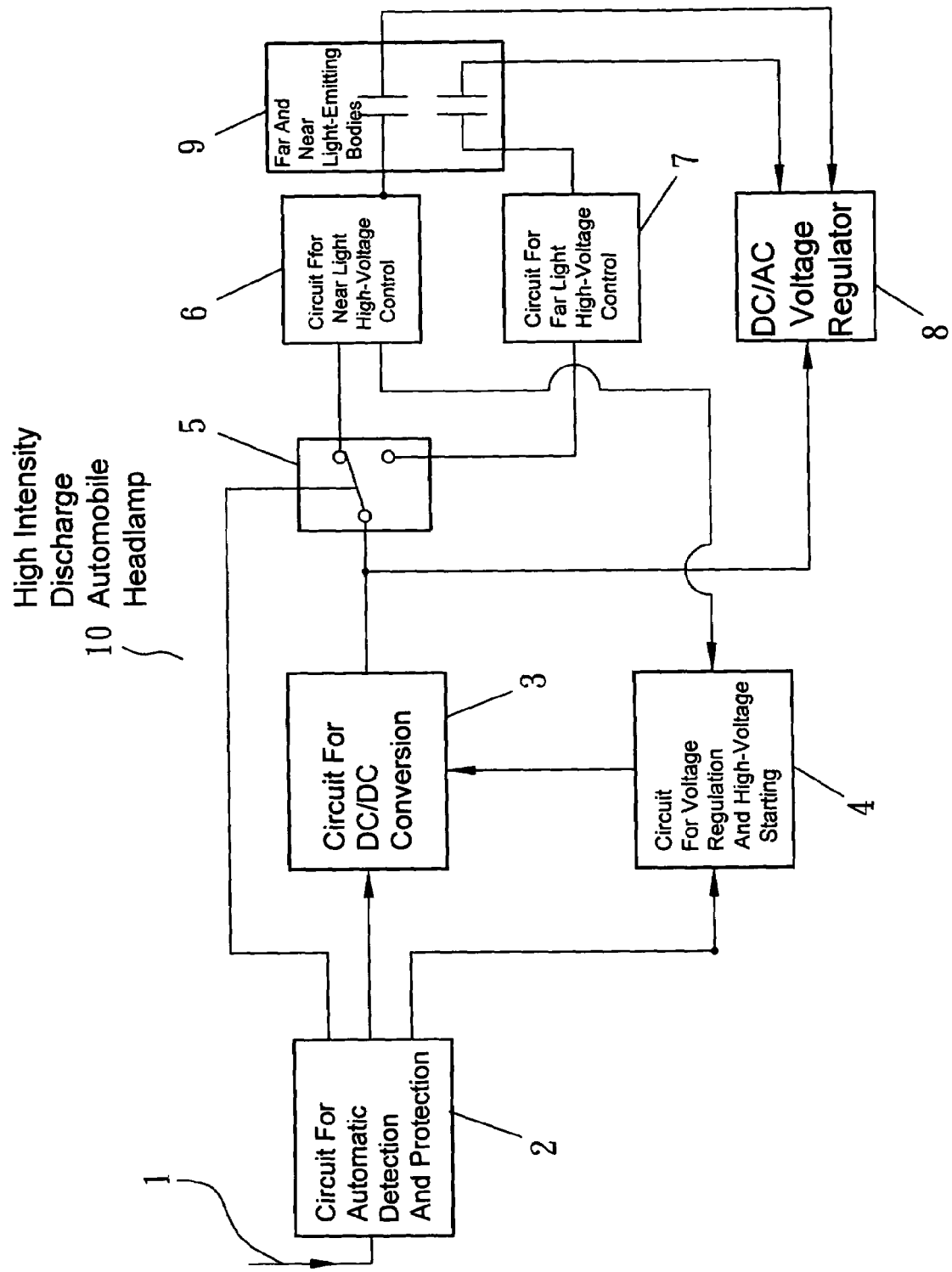
FIG. 1 is a circuit diagram of a multi-functional high intensity discharge automobile headlamp according to the present invention.

Referring to FIG. 1, which is a diagram showing the circuitry of a multi-functional high intensity discharge automobile headlamp 10 of the present invention, the high intensity discharge headlamp 10 comprises a circuit for automatic detection and protection 2, a circuit for DC/DC conversion 3, a circuit for voltage regulation and high-voltage starting 4, a circuit for near light high-voltage control 6 and a circuit for far light high-voltage control 7 and a DC/AC voltage regulator 8. When it detects an unstable connected voltage, the circuit for automatic detection and protection 2 activates the circuit for voltage regulation and high-voltage starting 4, thereby the circuit for voltage regulation and high-voltage starting 4 providing the functions of a constant voltage regulator and a high-voltage power supply. The circuit for voltage regulation and high-voltage starting 4 can further be connected to a circuit for DC/DC conversion 3 for increasing the connected voltage. When the detected voltage exceeds 12V, the circuit for automatic detection and protection 2, connected with the circuit for DC/DC conversion 3, increases the voltage according to 12V/85V and connects to a Hi/Low switch 5. The Hi/Low switch 5 receives the output voltage of the circuit for automatic detection and protection 2 and sends a right voltage according whether the measured and confirmed value is far-light or near near-light voltages to the Hi/Low switch 5 for the control of either near lights or far lights. The circuit for near light high-voltage control 6 and the circuit for far light high-voltage control 7 are send respective voltages to far and near light-emitting bodies 9, The far and near light-emitting bodies 9 is connected to a DC/AC voltage regulator 8 for retrieving 85V DC voltage from the circuit for DC/DC conversion 3 and converting it to 85V AC voltage so as to provide a square-wave AC signal for stabilizing the emission of the far lights. On the other hand, the circuit for near light high-voltage control 6 is connected to a circuit for voltage regulation and high-voltage starting 4 for switching to a circuit for DC/DC conversion 3 as the voltage supplied to the near lights is abnormal, whereby the voltage to the light will be terminated.

Figure 2:
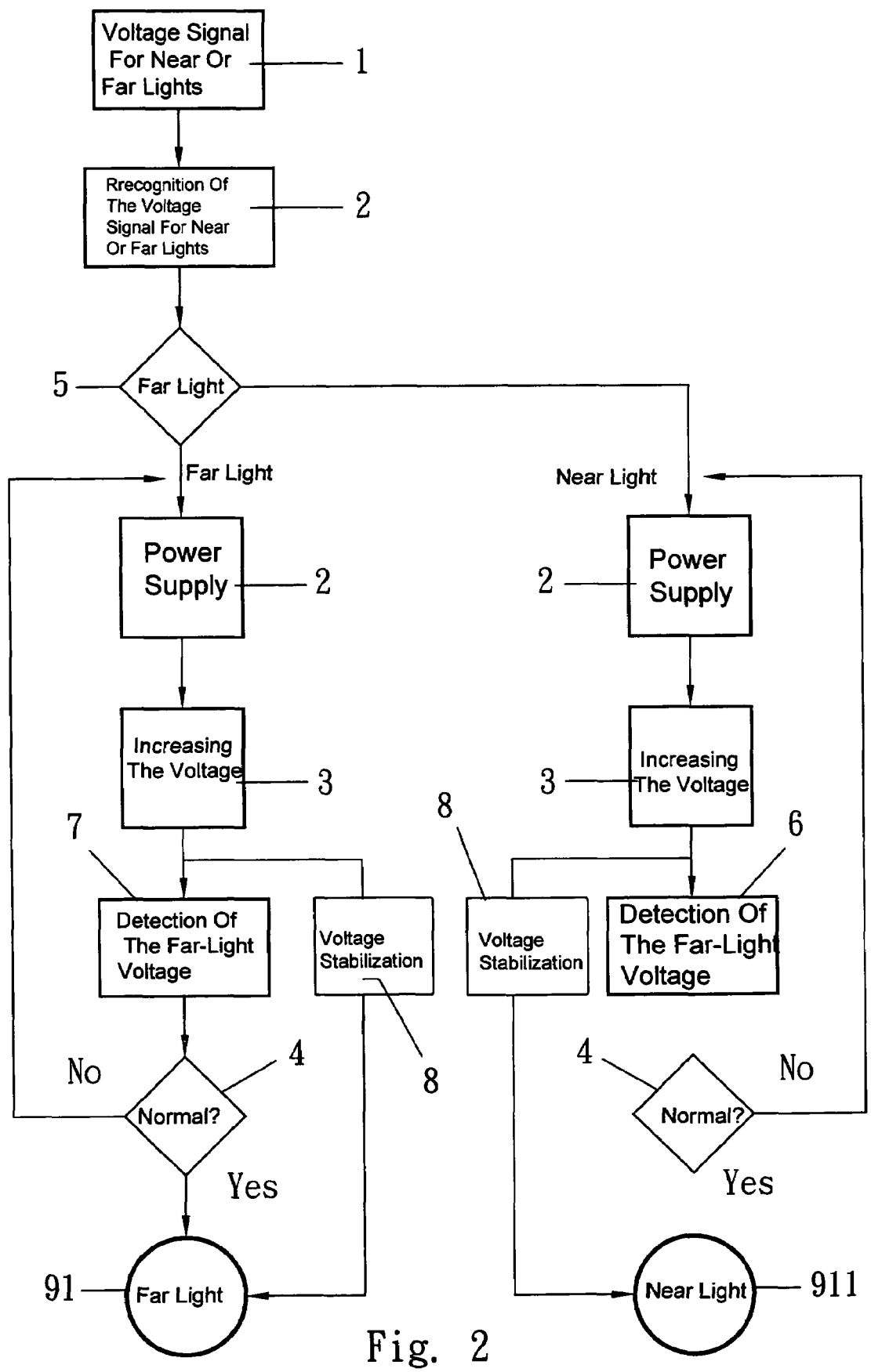
FIG. 2 is a control flow chart of the multi-functional high intensity discharge automobile headlamp in FIG. 1.

Referring to FIG. 2, which is a flowchart showing the control circuitry of a multi-functional high intensity discharge automobile headlamp 10, the power cord 1 will send a voltage signal to the circuit for automatic detection and protection 2, whereby whether the voltage is for near lights or for far lights will be determined and assured. The power of the assured voltage is supplied by the circuit for the DC/DC conversion 3 and further increased according to 12V/85V. If the voltage is increased, it will be sent to the circuit for far light high-voltage control 7 for a far light 91. If the far light 91 is broken or disconnected with a lamp, the voltage thereof will be abnormal and be fed back to the circuit for voltage regulation and high-voltage starting 4, whereby the circuit for DC/DC conversion 3 will be notified to shut down the associated power supply. If, on the other hand, the output voltage of the far light 91 is normal, the circuit for far light high-voltage control 7 will activate and do work on the far light 91 of the far and near light-emitting bodies 9. Meanwhile, the circuit for DC/DC conversion 3 will supply power to the far light 91, and it also activates the DC/AC voltage regulator 8 for supplying a voltage-stabilizing square-wave AC signal so that the far light 91 can work under a stable voltage and lasts long. When the voltage is measured to be the near-light voltage, the circuit for DC/DC conversion 3 will provide power to the light. At the same time, the circuit for DC/DC conversion 3 will increase the voltage and send to the circuit for near light high-voltage control 6 of the near light 911. If the near light 911 is broken or disconnected with a lamp, the voltage thereof will be abnormal and be fed back to the circuit for voltage regulation and high-voltage starting 4, whereby the circuit for DC/DC conversion 3 will be notified to shut down the associated power supply. If, on the other hand, the output voltage of the near light 911 is normal, the circuit for near light high-voltage control 6 will activate and do work on the near light 911 of the far and near light-emitting bodies 9. Meanwhile, the circuit for DC/DC conversion 3 will supply power to the near light 911, and it also activates the DC/AC voltage regulator 8 for supplying a voltage-stabilizing square-wave AC signal so that the near light 911 can work under a stable voltage and lasts long.

Figure 3:
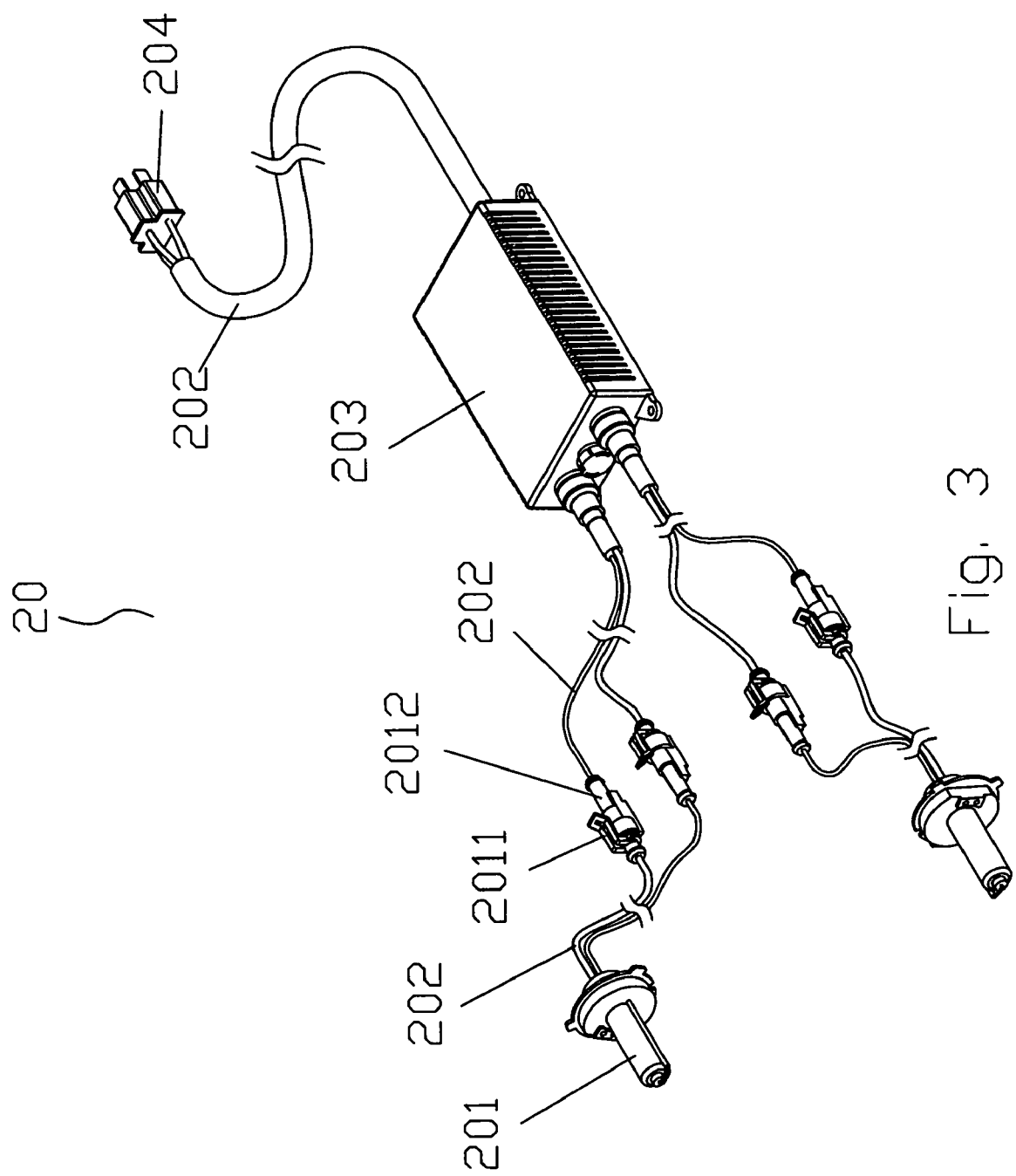
FIG. 3 is a perspective view of a multi-functional high intensity discharge automobile headlamp of the present invention, wherein the headlamp has two light bulbs.

Referring to FIG. 3, which is a perspective view of a multi-functional high intensity discharge automobile headlamp of the present invention with two light bulbs, the high intensity gas discharge headlamp 201 is connected to a hook 2011, and the system control box 203 is connected with a pin 2012 through a power cord 202. At the other end of the power cord 202, there is a three-foot power socket 204. The power socket 204 is plugged into the power supply within a car, so that the voltage for the near lights or the far lights can be supplied.

Figure 4:
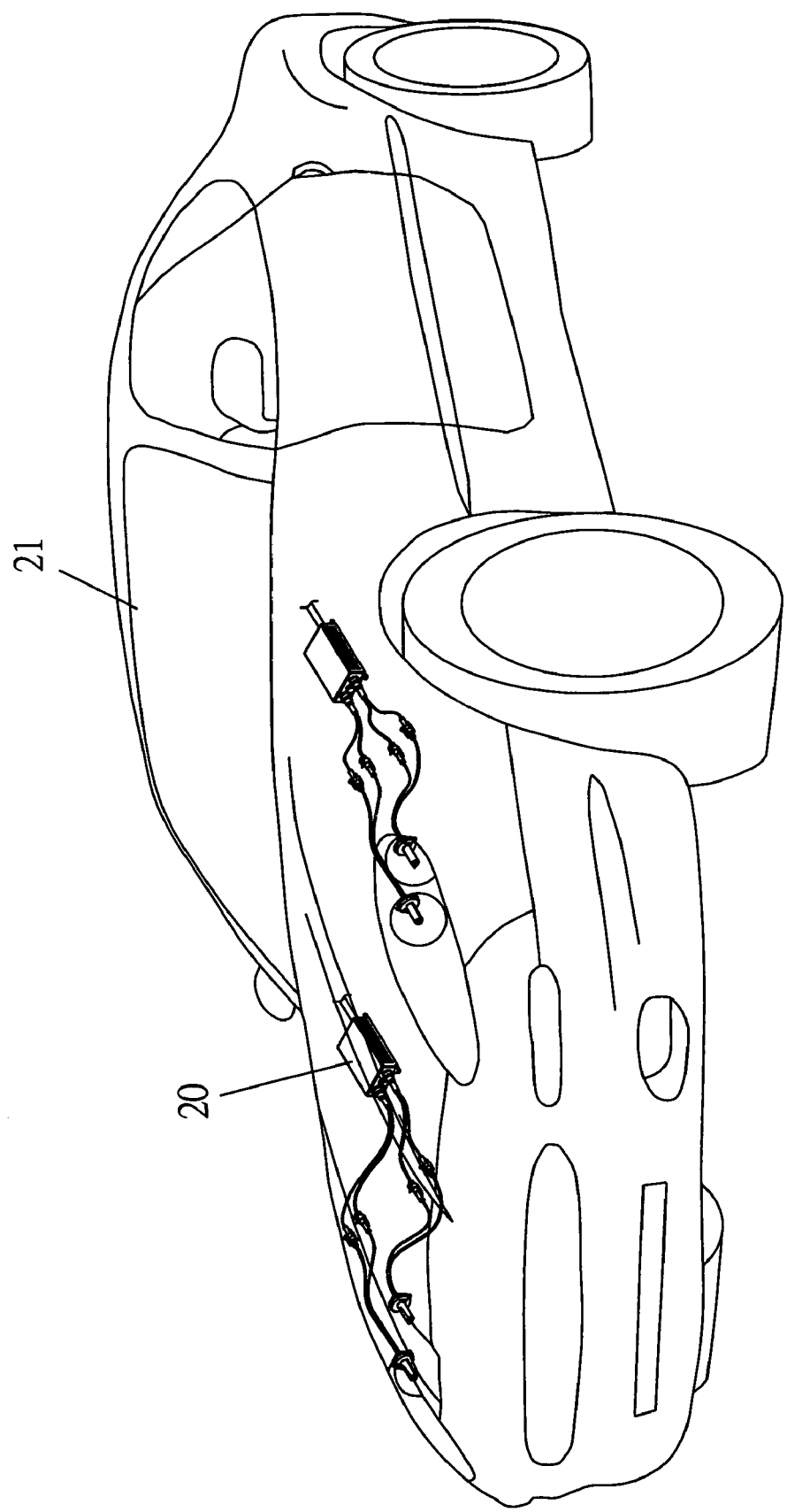
FIG. 4 is a perspective view of the multi-functional high intensity discharge automobile headlamps in FIG. 3, when used in an automobile.

Referring to FIG. 4, which is a perspective view of a multi-functional high intensity discharge automobile headlamps 20 used in an automobile 21, the high intensity gas discharge headlamps 20 are installed respectively on two lateral sides within an engine hood of the automobile 21, each connected with a far-light bulb 9 and a near-light bulb 91.

Figure 5:
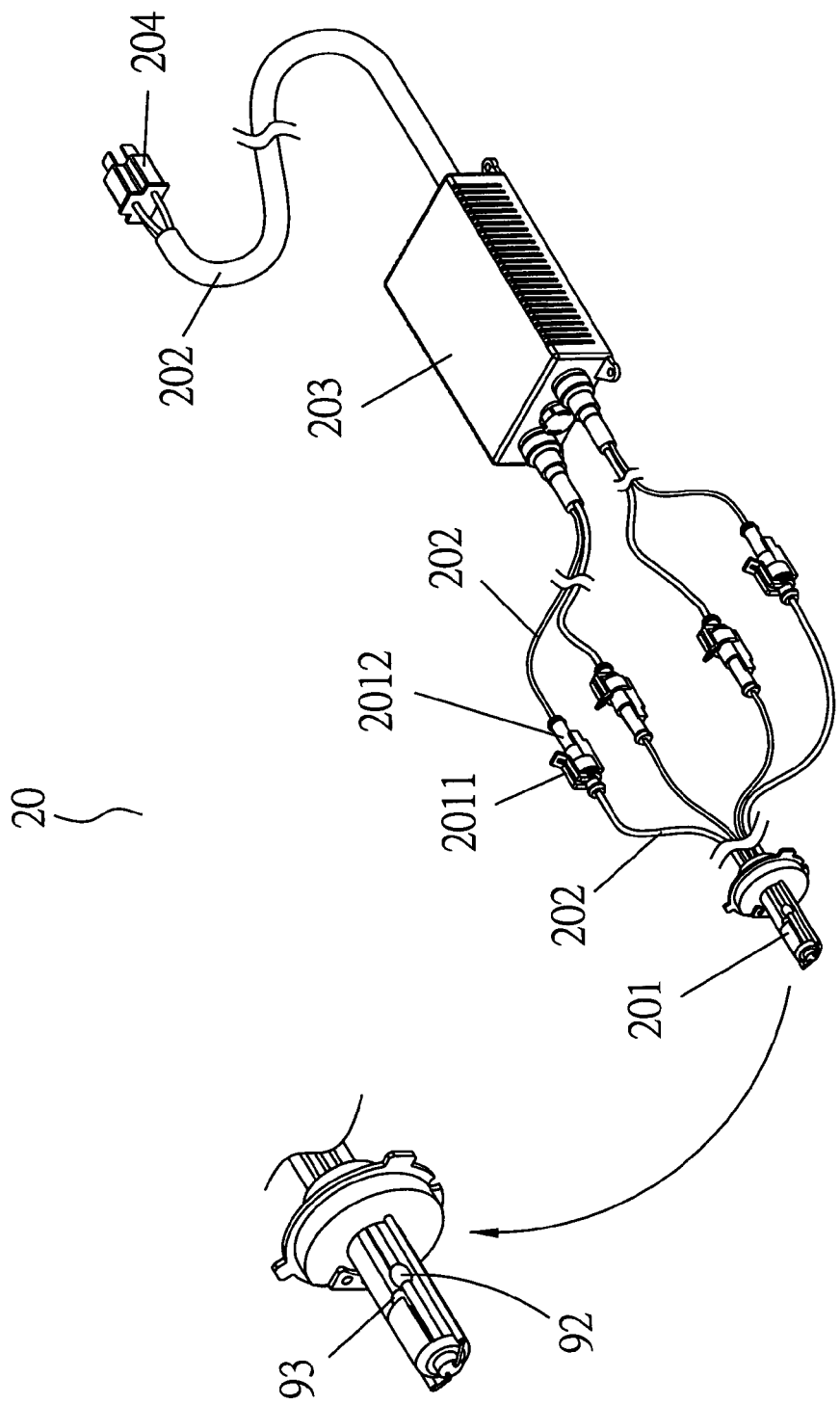
FIG. 5 is a perspective view of a multi-functional high intensity discharge automobile headlamp of the present invention, wherein the headlamp has one light bulb.

Referring to FIG. 5, which is a perspective view of a multi-functional high intensity discharge automobile headlamp 20 of the present invention with one light bulb, the high intensity gas discharge headlamp 20 is connected with a light bulb having a far-light filament 92 and a near-light filament 93.

Figure 6:
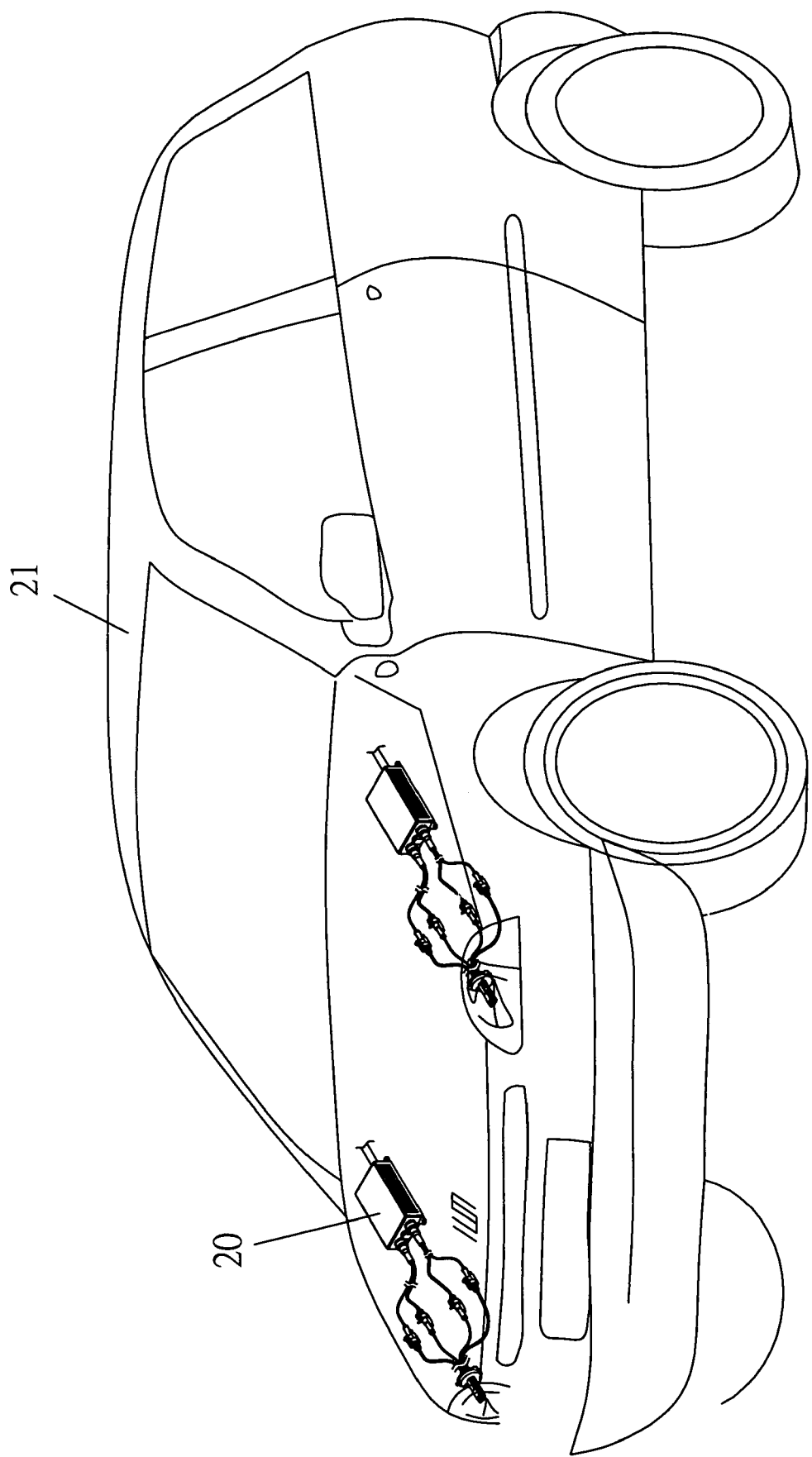
FIG. 6 is a perspective view of the multi-functional high intensity discharge automobile headlamps in FIG. 5, when used in an automobile.

Referring to FIG. 6, which is a perspective view of a pair of multi-functional high intensity discharge automobile headlamps used in an automobile 21, the high intensity gas discharge headlamps 20 are installed respectively on two lateral sides within an engine hood of the automobile 21, each connected to a single light bulb having a far-light filament 92 and a near-light filament 93.

Therefore, the present invention has the advantages as follows.

1. The circuit for automatic detection and protection can identify between a near-light voltage and a far-light voltage and assure it is a near-light voltage or a far-light voltage.

2. The circuit for DC/DC conversion can increase the voltage to either 12V or 85 V, which is necessary for a high intensity gas discharge headlamp.

3. The circuits for near light and far light high-voltage control can detect the output voltage for the near and far lights. When the voltages of the lights are abnormal, the voltage will feed back to the circuit for voltage regulation and high-voltage starting and the circuit for DC/DC conversion in order to terminate the voltage supply for the lamp, whereby the lamp can last long.

4. The DC/AC voltage regulator can provide the lamp with a square-wave AC signal by which the voltage for the lamp can be stabilized.

The multi-functional high intensity discharge automobile headlamp of the present invention can be used in cars of different brands.

The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A multi-functional high intensity discharge automobile headlamp, comprising:

a circuit for automatic detection and protection, said circuit for automatic detection and protection identifying and switching between a far-light voltage and a near-light signal;

a circuit for DC/DC conversion connected with said circuit for automatic detection and protection, said circuit for DC/DC conversion being connected to a far light and near light switch for increasing said voltage to either a far-light voltage value or a near-light value;

a circuit for voltage regulation and high-voltage starting connected with said circuit for DC/DC conversion, said circuit for voltage regulation and high-voltage starting controlling and restricting a high-voltage power according to a predetermined power;

a circuit for near light high-voltage control connected with said circuit for voltage regulation and high-voltage starting and to said near light and far light switch, said circuit for near light high-voltage control further sending a desired voltage value for a corresponding light bulb and being capable of detecting an anomaly in said near-light bulb and feeding back to said circuit for automatic detection and protection and notifying said circuit for DC/DC conversion to stop supplying power;

a circuit for far light high-voltage control connected with said circuit for voltage regulation and high-voltage starting and to said near light and far light switch, said circuit for far light high-voltage control further sending a desired voltage value for a corresponding light bulb and being capable of detecting an anomaly in said far-light bulb and feeding back to said circuit for automatic detection and protection and notifying said circuit for DC/DC conversion to stop supplying power; and a DC/AC voltage regulator connected with said circuit for DC/DC conversion, said DC/AC voltage regulator providing a low-frequency square-wave signal that facilitates the control of a light-bulb operation.

2. The multi-functional high intensity discharge automobile headlamp of claim 1 wherein said headlamp is powered by a power supply of an automobile.

3. The multi-functional high intensity discharge automobile headlamp of claim 1 wherein said gas discharge lamp has one light bulb with a near-light filament and a far-light filament.

4. The multi-functional high intensity discharge automobile headlamp of claim 1 wherein said gas discharge lamp has a plurality of near and far light bulbs.

* * * * *